(12) United States Patent
Roussel-Garcia et al.

(10) Patent No.: US 12,521,759 B2
(45) Date of Patent: Jan. 13, 2026

(54) SYSTEM FOR GENERATING ACOUSTIC ULTRASONIC VIBRATION WITH IMPROVED AMPLITUDE CONTROL

(71) Applicant: HERRMANN ULTRASCHALLTECHNIK GMBH & CO. KG, Karlsbad (DE)

(72) Inventors: Raquel Roussel-Garcia, Pforzheim (DE); Timo Zink, Karlsruhe (DE); Robin Alexander Bode, Pforzheim (DE)

(73) Assignee: Herrmann Ultraschalltechnik Gmbh & Co. KG, Karlsbad (DE)

( * ) Notice: Subject to any disclaimer, the term of this patent is extended or adjusted under 35 U.S.C. 154(b) by 0 days.

(21) Appl. No.: 18/846,759

(22) PCT Filed: Mar. 6, 2023

(86) PCT No.: PCT/EP2023/055584
§ 371 (c)(1),
(2) Date: Sep. 13, 2024

(87) PCT Pub. No.: WO2023/174724
PCT Pub. Date: Sep. 21, 2023

(65) Prior Publication Data
US 2025/0108405 A1    Apr. 3, 2025

(30) Foreign Application Priority Data
Mar. 15, 2022    (DE) .......................... 102022105944.8

(51) Int. Cl.
*B06B 1/02*    (2006.01)
(52) U.S. Cl.
CPC .................................. *B06B 1/0261* (2013.01)

(58) Field of Classification Search
CPC .......... B06B 1/00; B06B 1/02; B06B 1/0207; B06B 1/0223; B06B 1/0261
See application file for complete search history.

(56) References Cited

FOREIGN PATENT DOCUMENTS

DE    102004026826 A1    1/2006
DE    60319101 T2    1/2009
(Continued)

OTHER PUBLICATIONS

English translation of EP2705906A2 (Year: 2014).*
(Continued)

*Primary Examiner* — Tulsidas C Patel
*Assistant Examiner* — Joshua Kiel M Rodriguez
(74) *Attorney, Agent, or Firm* — Hudak, Shunk & Farine Co. LPA

(57) ABSTRACT

A system for generating acoustic ultrasonic vibration, with a generator for generating an alternating voltage (U) with a frequency f and converter for converting the alternating voltage into acoustic ultrasonic vibration, with a control device, which captures the vibration amplitude ($A_{ist}$) of the ultrasonic vibration and compares said vibration amplitude with a desired vibration amplitude ($A_{soll}$) and changes a manipulated variable with the goal of bringing the captured vibration amplitude ($A_{ist}$) closer to the desired vibration amplitude ($A_{soll}$). The generator has a frequency control module with a frequency control input. The frequency control module defines, in accordance with a signal present at the frequency control input, the frequency (f) of the alternating voltage (U) to be generated. A control apparatus converts an input signal into a manipulated signal, the desired vibration amplitude ($A_{soll}$) provided as the input signal, and the manipulated signal connected to the frequency control input.

6 Claims, 3 Drawing Sheets

(56) References Cited

FOREIGN PATENT DOCUMENTS

| | | |
|---|---|---|
| DE | 102010004468 A1 | 7/2011 |
| DE | 102015212809 A1 | 1/2017 |
| DE | 102017107617 A1 | 10/2018 |
| EP | 2705906 B1 | 6/2020 |
| EP | 3174644 B1 | 7/2020 |

OTHER PUBLICATIONS

Ashlin, "What is a feedback control system and what are its types?," AutomationForum.co, May 31, 2021, retrieved from the Internet: https://automationforum.co/what-is-a-feedback-control-system-and-what-are-its-types/ [retrieved on Jan. 23, 2025] (Year: 2021).*

Ashlin, "What is a feedback control system and what are its types?," May 31, 2021, AutomationForum.co, retrieved from the Internet: https://automationforum.co/what-is-a-feedback-control-system-and-what-are-its-types/ [retrieved on Jun. 2, 2025] (Year: 2021).*

\* cited by examiner

SYSTEM FOR GENERATING ACOUSTIC ULTRASONIC VIBRATION WITH IMPROVED AMPLITUDE CONTROL

FIELD OF THE INVENTION

The present invention relates to a system for generating an ultrasonic acoustic vibration, comprising a generator for generating an alternating electric voltage and a converter for converting the alternating electric voltage into an ultrasonic acoustic vibration. Such systems are known in principle. The converter usually has piezoelectric elements which convert an alternating electric voltage into a mechanical vibration, namely an acoustic vibration. The converter is often connected to a sonotrode which is designed to be excited by an ultrasonic vibration and to transfer this to a material to be processed with which the sonotrode is brought into contact.

BACKGROUND OF THE INVENTION

The converter and the sonotrode and an amplitude transformer, which may be arranged between the converter and the sonotrode, form an ultrasonic vibration unit. The converter, the sonotrode and, if applicable, the amplitude transformer are tuned to each other in such a way that they can be made to resonate at the same ultrasonic frequency.

The sonotrode usually has a sealing surface that is arranged opposite a counter-tool and is intended for processing a material arranged between the sonotrode and the counter-tool.

For example, a device is known from DE 603 19 101 T2 in which a material web is moved between a sonotrode and a counter-tool and the sonotrode is pressed onto the material web with a welding force during processing. Whenever processing is not to take place, the sonotrode is moved away from the material web.

However, the regular movement of the sonotrode back and forth causes problems with the material web guidance, especially at very high web speeds. In addition, high web speeds cannot be realised because the sonotrode cannot be moved back and forth fast enough.

It has therefore already been proposed in DE 10 2017 107 617 A1 that the sonotrode should no longer be moved away from the material web when no processing is to take place, and instead only the vibration amplitude should be reduced when no processing is to take place. Thus, during a welding interval, the sonotrode is excited with a higher vibration amplitude than during a non-welding interval.

The device described in DE 10 2017 107 617 A1 therefore has a regulating device that records the vibration amplitude $A_{ist}$ of the ultrasonic vibration and compares it with a desired vibration amplitude $A_{soll}$, and changes a control variable with the aim of bringing the recorded vibration amplitude $A_{ist}$ closer to the desired vibration amplitude $A_{soll}$.

In principle, the generator that supplies the converter with the appropriate AC voltage to generate the ultrasonic vibration can simply be switched off during the interval in which no processing is to take place.

However, it has been shown that completely switching off the sonotrode means that when it is switched back on, i.e. at the beginning of the next interval in which the sonotrode is to process the material web, the time until the sonotrode is back in the desired steady state is comparatively long, so that, especially at high web speeds, the range in which the material web is not yet optimally processed is too long.

Therefore, the desired vibration amplitude $A_{soll}$ in the situations in which no welding is to take place is greater than zero, but considerably smaller than the desired vibration amplitude $A_{soll}$ in the situations in which welding is to take place.

However, if the processing speed is increased even further, this method and the associated rapid increase or decrease in the vibration amplitude are no longer possible, as the regulation is not able to adapt the vibration amplitude to the desired vibration amplitude $A_{soll}$, which changes abruptly for a very short moment, so quickly.

EP 3 174 644 B1 describes a device in which a rotating, cylindrical counter-tool has raised sections and welding is only carried out by means of ultrasound when the raised sections are positioned opposite the sonotrode. This device has a trigger device that detects the position of the projections and a regulation device that either switches the regulation on or off depending on the result of the detection. However, the method described in EP 3 174 644 B1 requires the presence of corresponding projections. It is not suitable for devices that do not have projections and for devices that have to reduce the vibration amplitude whenever no welding is to be effected.

Since the known generators have to adapt the frequency f of the alternating voltage to be generated to the resonance frequency of the ultrasonic oscillating unit to be driven, they usually have a frequency control module with a frequency control input that determines the frequency f of the alternating voltage U to be generated as a function of a signal applied to the frequency control input.

EP 2705906 B1 describes a method in which the excitation frequency of an ultrasonic generator is controlled in such a way that the phase of the impedance of the oscillating system is greater than 0°.

SUMMARY OF THE INVENTION

Based on the described state of the art, the present invention is therefore intended to provide a system of the type mentioned above that at least mitigates the disadvantages mentioned and allows higher processing speeds and the associated abrupt load changes.

According to the invention, this task is solved by a system for generating an ultrasonic acoustic vibration with a generator for generating an alternating electrical voltage U with a frequency f and a converter for converting the alternating electrical voltage into an ultrasonic acoustic vibration with a regulation device which detects the vibration amplitude $A_{ist}$ of the ultrasonic vibration and compares it with a desired vibration amplitude $A_{soll}$ and changes a manipulated variable with the aim of approximating the detected vibration amplitude $A_{ist}$ to the desired vibration amplitude $A_{soll}$, wherein the generator has a frequency control module with a frequency control input which determines the frequency f of the alternating voltage U to be generated as a function of a signal present at the frequency control input, wherein a drive control unit is provided which converts an input signal into a manipulated variable signal, the desired vibration amplitude $A_{soll}$ being provided as the input signal, and the manipulated variable signal being connected to the frequency control input, wherein the frequency of the electrical alternating voltage is used as the manipulated variable, and wherein the regulation device outputs a control variable signal which is connected to the frequency control input.

Since the ultrasonic vibration system described is optimized for a specific ultrasonic frequency and resonates at this frequency, excitation at a different frequency leads to a reduction in the ultrasonic vibration amplitude.

Since the desired vibration amplitude $A_{soll}$ is provided as the input signal in accordance with the invention, the drive control unit causes an immediate change in the excitation frequency if the desired vibration amplitude $A_{soll}$ changes. It is therefore not necessary to wait for the regulating device to detect a deviation between $A_{ist}$ and $A_{soll}$.

The abrupt change in the desired vibration amplitude $A_{soll}$ when a non-weldable area of the material is moved between the sonotrode and the counter-tool during the welding process, or when a weldable area of the material is moved between the sonotrode and the counter-tool while the vibration amplitude is reduced and therefore no welding is taking place, represents a disturbance for the regulation system that cannot correct it quickly enough.

However, since both the time and the magnitude of the abrupt change in the desired vibration amplitude $A_{soll}$ are known, this information is used directly by the drive control unit, which uses the desired vibration amplitude $A_{soll}$ as its input signal.

When setting or programming the drive control unit, the difference between the frequency of the ultrasonic vibration to be used during a welding process and the frequency to be used between the welding processes, i.e. when the sonotrode is operated at a reduced vibration amplitude and the material is not to be welded, can be determined in advance or experimentally. The drive control unit can then be set in such a way that when the expected abrupt amplitude jump of the desired vibration amplitude $A_{soll}$ is detected, the manipulated variable signal reflects the necessary frequency jump, i.e. the determined frequency difference.

As a result of the intervention of the control device, the system abruptly operates at the new working frequency and, due to the correlation between the working frequency and the vibration amplitude of the vibration system, at the new desired vibration amplitude.

The regulation device therefore does not have to adjust the new working parameters of the system, but can immediately continue the regulation in a virtually perfectly adjusted state.

The regulation device must react to all unforeseen disturbances in the system. Unforeseen disturbances are, for example, temperature changes or thickness fluctuations within the material webs to be processed.

According to the invention, the frequency of the alternating electrical voltage U is used as the manipulated variable of the regulation device. Here too, the regulation device must react to all unforeseen disturbances in the system.

In this case, it is not necessary to vary the voltage at the generator. The ultrasonic vibration amplitude can be achieved solely by changing the frequency of the electrical excitation voltage.

According to the invention, the regulation device outputs a control variable signal that is connected to the frequency control input. In this way, the regulation device also uses the frequency control input of the frequency control module. For example, it is possible for the control variable signal and the manipulated variable signal to be added or for the manipulated variable signal to be subtracted from the control variable signal, and for the sum or difference to be connected to the frequency control input. In this case, the drive control unit also generates a manipulated variable signal that only represents a frequency offset value. Since the change in the desired vibration amplitude is known before the abrupt change occurs, the change in the excitation frequency f that will be necessary is directly initiated by the drive control unit using the preferred method described, without the regulation device having to take over a corresponding regulation task.

In a further preferred embodiment, the generator has two operating modes, in which in a first operating mode only the regulation device is used and in a second operating mode both the regulation device and the drive control unit are used.

For example, the drive control unit can be used only during the welding interval or only during the non-welding interval, while otherwise any necessary interventions in the system are handled by the regulation device.

In an alternative embodiment, it is therefore provided that if the desired vibration amplitude $A_{soll}$ remains constant or does not change by more than a predetermined amount during a predetermined time interval, the first operating mode is used and if the desired vibration amplitude $A_{soll}$ changes by more than the predetermined amount during the predetermined time interval, the second operating mode is used.

BRIEF DESCRIPTION OF THE DRAWINGS

Further advantages, features and possible applications of the present invention will become clear from the following description of a preferred embodiment and the associated figures. The following show.

DETAILED DESCRIPTION OF THE INVENTION

Figure 1:
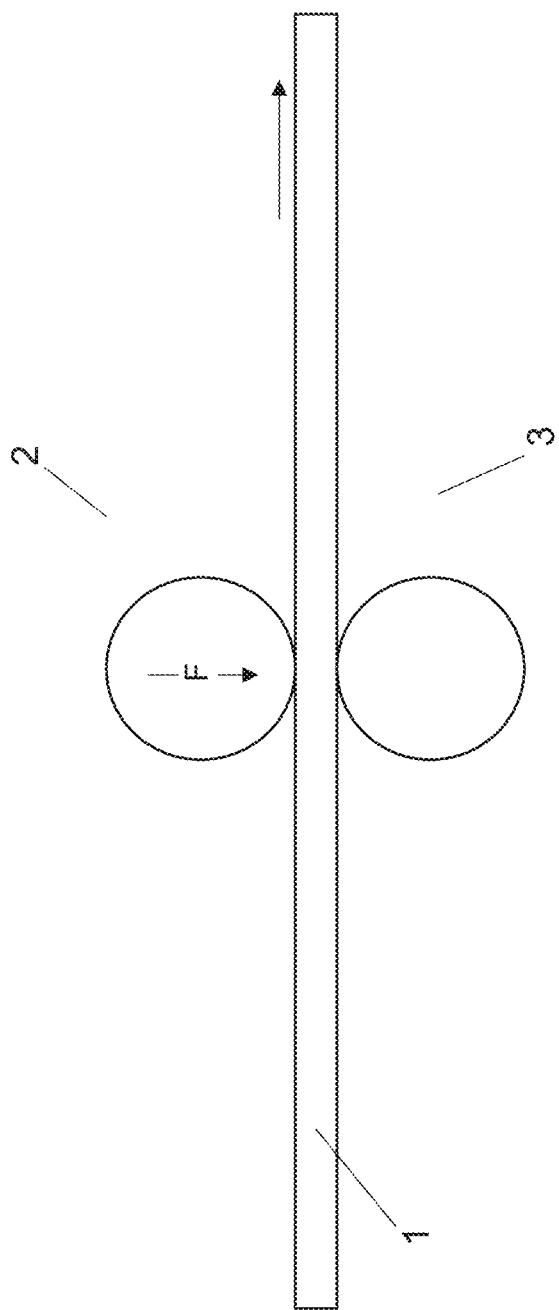
FIG. 1 a schematic representation of a device that can be equipped with the system according to the invention, FIG. 2 a schematic representation of the time dependence of the vibration amplitude and force.

FIG. 1 shows a schematic representation of a device for the intermittent ultrasonic processing of a material web. The material web 1 is moved in the direction of the arrow between a sonotrode 2 and a counter tool 3. Both the sonotrode 2 and the counter-tool 3 are roller-shaped in this embodiment. The sonotrode 2 is pressed with a force F in the direction of the counter-tool 3, so that the material web 1 is pressed together between the sonotrode 2 and the counter-tool 3.

To set the sonotrode in motion, it is coupled to a converter (not shown), which converts an alternating electrical voltage into an acoustic ultrasonic vibration. For this purpose, an alternating electrical voltage is transmitted from a generator (not shown) to the converter, which transmits the generated acoustic ultrasonic vibration to the sonotrode 2.

The material web 1 is processed when the sonotrode 2 is pressed onto the material web with the appropriate welding force $F_A$ and the sonotrode oscillates with an appropriate oscillation amplitude A.

However, there are applications in which not the entire material web 1 is to be processed, but only sections of it.

In these cases, the amplitude of the ultrasonic oscillation of the sonotrode is always reduced in the design shown when no processing is to take place. The material web is also passed between the sonotrode and the counter tool, but due to the reduced amplitude of the ultrasonic oscillation, no processing takes place.

Figure 2:
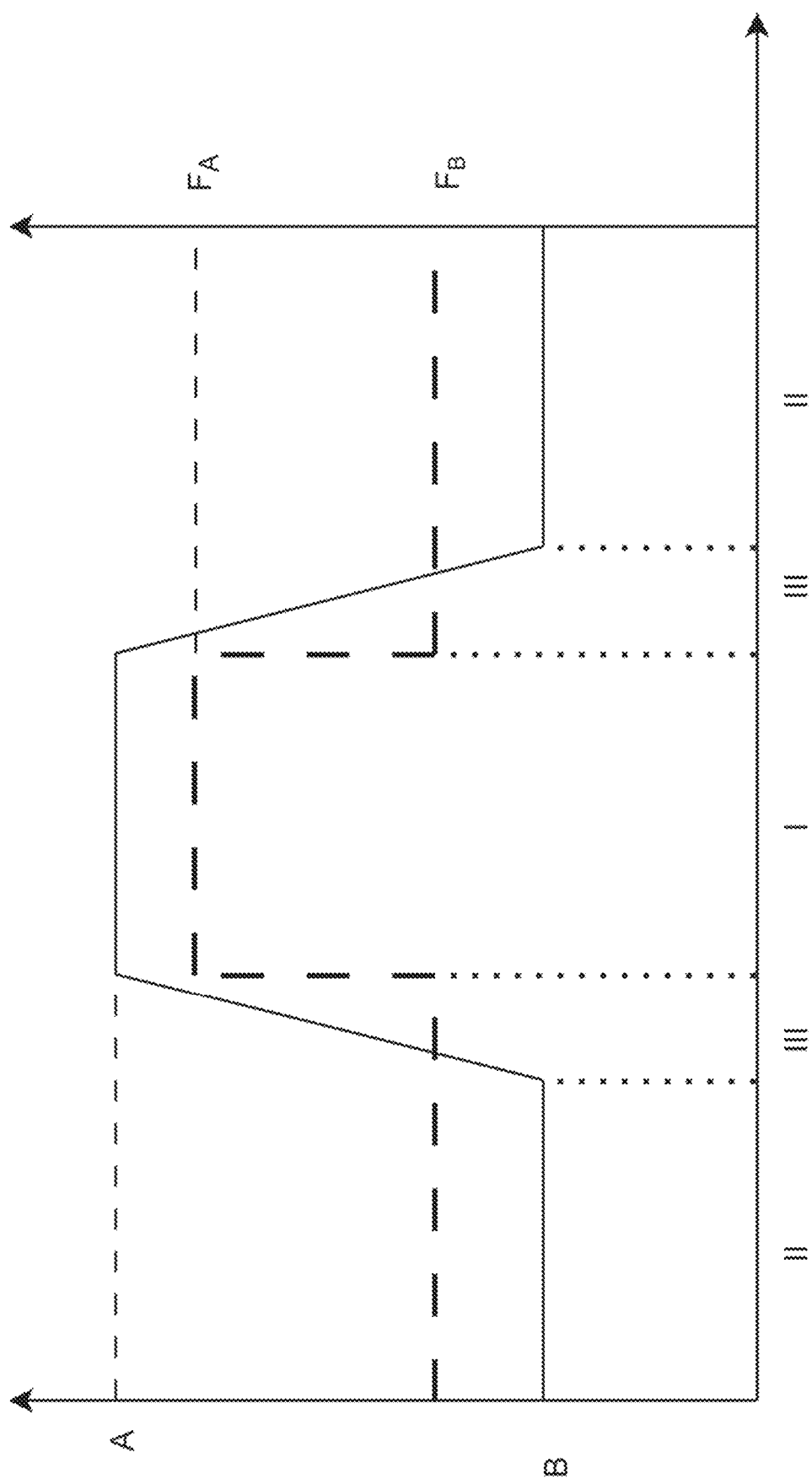

This is shown schematically in FIG. 2. The diagram shows both the vibration amplitude (solid line) and the welding force (dotted line) with which the sonotrode is pressed in the direction of the counter tool, in arbitrary units. It can be seen that in an interval I, the vibration amplitude assumes the value A and the force with which the sonotrode is moved in the direction of the counter tool assumes the value $F_A$. The actual processing takes place in interval I.

Before and after processing in interval I, both the vibration amplitude in interval II and the force with which the sonotrode is pressed in the direction of the counter tool are reduced to the values B and FB. No processing takes place during movement interval II. Between the movement interval II and the processing interval I, a ramp interval III is shown here, in which the vibration amplitude is continuously increased or decreased.

In this ramp interval III, it is not possible for conventional regulation devices to adjust the vibration amplitude quickly enough at very high path speeds, with the result that machining may occur in movement interval II, which is not desired, or that insufficient machining takes place at the beginning of machining interval I.

Therefore, the invention provides for the additional intervention of a drive control unit at least in ramp interval III, which converts the desired vibration amplitude $A_{soll}$ into a manipulated variable signal, the manipulated variable signal being connected to the frequency control input of the frequency control module.

Figure 3:
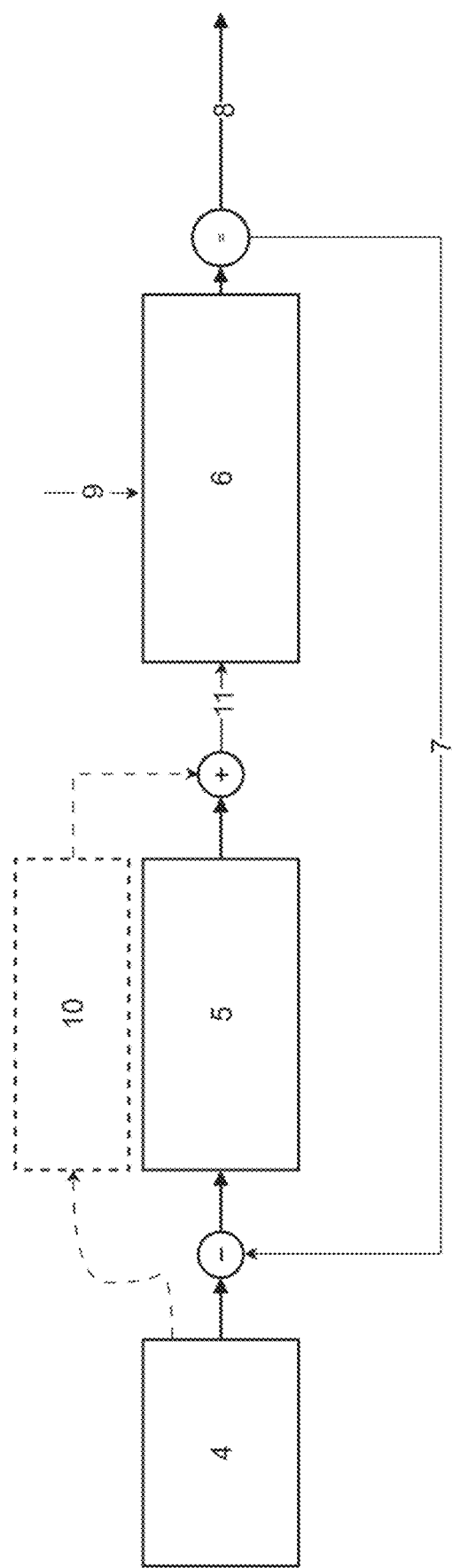
FIG. 3 shows a schematic block diagram of the regulation device according to the invention.

FIG. 3 shows an example block diagram of an embodiment of the system according to the invention. The actual regulated system 6 is usually exposed to a disturbance variable 9. Disturbance variables can, for example, be changes in length in the system, e.g. due to changes in temperature.

In this example, a setpoint generator 4 specifies the desired vibration amplitude 4. This is compared with the actual vibration amplitude, i.e. the ACTUAL-signal 8, which is provided via the feedback signal, and the result of the comparison, e.g. as a difference, is made available to a regulating element 5.

If the regulating element 5 detects a deviation between the setpoint and actual values, the manipulated variable signal 11, which is provided to a frequency control input of the controlled system 6, is changed.

So far, the block diagram describes a known control method. However, a process-related abrupt change in the setpoint vibration amplitude would also result in an abrupt signal change at the input of the regulating element.

According to the invention, the setpoint amplitude is now transmitted in parallel to a drive unit 10, which calculates a manipulated variable signal from it, which is then added to the output of the regulating element 5, so that the sum of the manipulated variable signal generated by the drive unit and the manipulated variable signal generated by the regulating element is present at the frequency control input of the control path 6.

The process-related change in the target amplitude, which is known in advance, is therefore no longer regulated as a disturbance, but driven out via the drive control unit. To prevent abrupt intervention by regulating element 5, either i) the regulating parameter set of regulating element 5 can ensure relatively sluggish regulation (e.g. in the case of a PID controller, the D component is reduced and the I component increased), or ii) regulating element 5 can be deactivated for a short time in the event of an abrupt change in the setpoint amplitude, or iii) the setpoint signal can be made available to regulating element 5 at a slightly later point in time than to control unit 10, whereby the magnitude of the signal delay at the regulating element can correlate with the dead time of the control path. As a result, the control quality of the system can be significantly improved and the system can be used at significantly higher web speeds.

LIST OF REFERENCE SIGNS

1 Material web
2 Sonotrode
3 Counter tool
4 Setpoint generator
5 Regulating element
6 Controlled system
7 Feedback signal
8 Actual signal
9 Disturbance variable
10 Control unit
11 Manipulated variable signal
F Force
$F_A$ Welding force
A Oscillation amplitude
I Interval
II Movement interval
III Ramp interval

What is claimed is:

1. A system for generating an ultrasonic acoustic vibration, comprising:
a generator for generating an alternating electrical voltage U with a frequency f,
a converter for converting the alternating electrical voltage into an ultrasonic acoustic vibration, and
a regulation device which detects the vibration amplitude $A_{ist}$ of the ultrasonic vibration and compares it with a desired vibration amplitude $A_{soll}$ and changes a manipulated variable with the aim of approximating the detected vibration amplitude $A_{ist}$ to the desired vibration amplitude $A_{soll}$,
wherein the generator has a frequency control module with a frequency control input which determines the frequency f of the alternating voltage U to be generated as a function of a signal present at the frequency control input,
wherein a drive control unit is provided which converts an input signal into a manipulated variable signal, the desired vibration amplitude $A_{soll}$ being provided as the input signal, and the manipulated variable signal being connected to the frequency control input,
wherein the frequency of the electrical alternating voltage is used as the manipulated variable, and
wherein the regulation device outputs a control variable signal which is connected to the frequency control input.

2. The system according to claim 1, wherein the control variable signal and the manipulated variable signal are added, or the manipulated variable signal is subtracted from the control variable signal, and the sum or the difference is connected to the frequency control input.

3. The system according to claim 2, wherein the generator has two operating modes, in which in a first operating mode only the regulation device is used and in a second operating mode both the regulation device and the drive control unit are used.

4. The system according to claim 3, wherein if the desired vibration amplitude $A_{soll}$ remains constant or does not change by more than a predetermined amount during a predetermined time interval, the first operating mode is used and if the desired vibration amplitude $A_{soll}$ changes by more than the predetermined amount during the predetermined time interval, the second operating mode is used.

5. The system according to claim 1, wherein the generator has two operating modes, in which in a first operating mode only the regulation device is used and in a second operating mode both the regulation device and the drive control unit are used.

6. The system according to claim 5, wherein if the desired vibration amplitude $A_{soll}$ remains constant or does not change by more than a predetermined amount during a predetermined time interval, the first operating mode is used and if the desired vibration amplitude $A_{soll}$ changes by more than the predetermined amount during the predetermined time interval, the second operating mode is used.

* * * * *